United States Patent
Kamitani (10) Patent No.: US 7,540,885 B2
(45) Date of Patent: Jun. 2, 2009

(54) METHOD OF PROCESSING A CERAMIC CAPACITOR

(75) Inventor: Gaku Kamitani, Kyoto (JP)

(73) Assignee: Murata Manufacturing Co., Ltd., Nagaokakyo-Shi, Kyoto-Fu (JP)

( * ) Notice: Subject to any disclaimer, the term of this patent is extended or adjusted under 35 U.S.C. 154(b) by 0 days.

(21) Appl. No.: 10/218,395

(22) Filed: Aug. 15, 2002

(65) Prior Publication Data

US 2003/0061694 A1  Apr. 3, 2003

(30) Foreign Application Priority Data

Aug. 22, 2001  (JP)  ............................. 2001-251424
Jul. 29, 2002  (JP)  ............................. 2002-219434

(51) Int. Cl.
H01G 9/00  (2006.01)

(52) U.S. Cl. ................... 29/25.03; 29/25.41; 29/593; 324/548; 361/321.1

(58) Field of Classification Search ............... 29/25.35, 29/25.41, 25.42, 592.1, 593, 840, 407.01, 29/832; 361/311, 320, 321.1, 324; 324/548
See application file for complete search history.

(56) References Cited

U.S. PATENT DOCUMENTS

| | | | | |
|---|---|---|---|---|
| 4,095,099 A | * | 6/1978 | Ehrenhaft | 250/205 |
| 4,399,401 A | * | 8/1983 | Levinson et al. | 324/548 |
| 5,280,407 A | * | 1/1994 | Brennan | 361/311 |
| 6,236,555 B1 | * | 5/2001 | Leeser | 361/234 |
| 6,437,579 B1 | * | 8/2002 | Yamashita et al. | 324/548 |
| 6,642,721 B2 | * | 11/2003 | Tsuchiya | 324/548 |

FOREIGN PATENT DOCUMENTS

| | | |
|---|---|---|
| JP | 8-227826 | 9/1996 |
| JP | 08-306574 A | 11/1996 |
| JP | 2000-228338 A | 8/2000 |

OTHER PUBLICATIONS

Fasching, G., "Werkstoffe für die Elektrotechnik", Springer-Verlag Wien, ISBN 3-211-81947-9, pp. 477-490.
German Office Action, with English-language Translation, dated Sep. 22, 2006.
Japanese Office Action, with English-language Translation, dated Oct. 3, 2006.
German Office Action issued May 6, 2008 and English Language translation thereof in German Patent Application No. 10238589.0-34; Applicant: Murata Manufacturing Co., Ltd.

* cited by examiner

Primary Examiner—Donghai D. Nguyen
(74) Attorney, Agent, or Firm—Buchanan Ingersoll & Rooney PC (57) ABSTRACT

A method of processing a ceramic capacitor includes a first step of applying a DC voltage to a ceramic capacitor by a first DC voltage source, and a second step of applying a DC voltage by a second DC voltage source to generate in the ceramic capacitor a polarization in a direction opposite to a direction of a polarization generated by the application of the DC voltage in the first step, thereby reducing electric charge remaining in the ceramic capacitor.

5 Claims, 7 Drawing Sheets

METHOD OF PROCESSING A CERAMIC CAPACITOR

FIELD OF THE INVENTION

The present invention relates to a method of processing a ceramic capacitor.

BACKGROUND OF THE INVENTION

Ceramic capacitors use ceramic materials such as titanium oxide and barium titanate as dielectric members. In characteristics screening tests for quality assurance of products like above ceramic capacitors, ceramic capacitors are charged with a DC voltage and are then discharged. The test includes an insulation resistance test and a breakdown voltage test. The ceramic capacitors, however, are not fully discharged, and some electric charge is trapped and remains inside due to polarization.

Polarization is described below. In a ceramic capacitor, as it uses ceramic material as a dielectric member, dielectric particles in it respectively form electric dipoles each having a positive pole and a negative pole. Before application of a DC voltage, the electric dipoles can rotate freely each other, and are thus electrically neutralized. Thus, the ceramic capacitor has a required amount of capacitance. When a DC voltage is applied during the screening tests mentioned above, the internal electric dipoles are aligned so that the negative poles face a positively charged electrode of the ceramic capacitor whereas the positive poles face a negatively charged electrode. Accordingly, in the ceramic capacitor after the application of a DC voltage, the electric dipoles are aligned so as to inhibit flow of current; that is, capacitance is reduced.

A ceramic capacitor that reduces capacitance may not be used as a product. Thus, to recover capacitance of the ceramic capacitor, the ceramic capacitor having reduced capacitance generally undergoes an annealing process after the insulation resistance test. In this process the ceramic capacitor is heated to a temperature at or above the Curie point, (the temperature at which the polarization disappears) of the internal dielectric member and is maintained at that temperature for a required period of time. Accordingly, in the ceramic capacitor, the aligned electric dipoles of the dielectric member are freed, allowing the electric dipoles to freely rotate each other, whereby the capacitance of the ceramic capacitor is recovered.

The annealing process described above takes a long time because the ceramic capacitor must be heated to a high temperature. Thus, in order to increase production capacity, ceramic capacitors are manufactured by a batch process; that is, a plurality of ceramic capacitors is processed simultaneously instead of every one capacitor is processed one by one.

In the batch process, a large number of ceramic capacitors are mounted on a metallic tray, and the annealing process is performed. When the ceramic capacitors are picked off the tray, they adhere to the surface of the tray due to the high-temperature at the annealing time, making it more difficult to pick them off. Even if the ceramic capacitors are picked off, the adhesion of components of the ceramic capacitors requires time to be spent cleaning the tray, and the like, resulting in a lowering of production efficiency.

Furthermore, as part of the annealing process, performed after the tests in the ceramic capacitor manufacturing process time is required to cool the capacitors as they are heated to a high temperature. As a result, the annealing process must be performed separately from a packing product process after manufacturing, such as taping or bulk packing.

Because the annealing and packing processes are performed separately as described above, the cost of manufacturing ceramic capacitors is higher at least for the increased amount of work. Furthermore, longer time is required for a single annealing process, resulting in reduction of production capacity.

SUMMARY OF THE INVENTION

Accordingly, the inventors have made an intensive research of the annealing process described above, and have come to appreciate that recovery of capacitance of a ceramic capacitor, to achieve which the annealing process is performed, can be achieved by heating to a high-temperature at the time of soldering the ceramic capacitor to a circuit board. The Curie point, i.e., the temperature at the time of annealing, of barium titanate is in the order of 130° C., whereas a soldering temperature can be set at or above the Curie point.

As a result of further research with a presupposition that annealing can be achieved by soldering, it has been found that, disadvantageously, a voltage is generated at the time of annealing by soldering.

Accordingly, the present invention presupposes that the capacitance of a ceramic capacitor is to be recovered in a post-process in which a high-temperature heat is applied to the ceramic capacitor, such as soldering, without using an annealing process as described above. Furthermore, it is an object of the present invention to provide a method of processing a ceramic capacitor in which the amount of internal electrostatic absorption charge is reduced by an ordinary electric device to suppress generation of a voltage that accompanies electric discharge in a high-temperature process such as soldering. Such a method may reduce the overall amount of work, manufacturing time, and manufacturing cost.

A method of processing a ceramic capacitor, in which electric charge remaining in an internal electrode thereof is reduced after applying a DC discharge voltage to the ceramic capacitor, the step of generating a polarization in a direction opposite to a direction of polarization generated in the ceramic capacitor by electric means when the DC discharge voltage is applied.

In a preferred embodiments of the present invention, electric dipoles in the ceramic capacitor are aligned since a DC voltage has already been applied to the ceramic capacitor. Thus, the capacitance of the ceramic capacitor is lowered. Then, a polarization in a direction opposite to the direction of polarization generated in the step is generated in the ceramic capacitor. As the polarization is in different directions, residual charge in the ceramic capacitor is reduced. As polarization in a direction opposite to a direction of polarization having been generated in the ceramic capacitor by the DC voltage is generated by electric means, residual change in the capacitor is reduced. Accordingly, for example, a voltage generated when the ceramic capacitor is soldered onto a circuit board is reduced.

Preferred embodiments of the present invention have the advantage of eliminating the need for the known annealing process in the process of manufacturing ceramic capacitors, in relation to which the various disadvantages described above have been observed. Accordingly, the amount of work can be reduced, reducing manufacturing costs and manufacturing time. In this case, reduced capacitance is recovered by depolarization in a high-temperature process after manufacturing, such as soldering.

According to more preferred embodiments of the present invention, the electric device reduces the electrostatic absorption charge as a way of applying a DC voltage to the ceramic capacitor which has a polarity opposite to a polarity of the DC voltage applied.

Alternatively, the electric device reduces the electrostatic absorption charge as a way of applying a polarity changing voltage, which polarity is changed gradually, and which amplitude is decreased gradually. When such a changing polarity voltage is applied, the electrostatic absorption charge is neutralized without setting special conditions. That is, although a voltage and application time must be set when an opposite polarity is applied, ceramic capacitors of any type can be processed under the same conditions where a changing polarity is used. A rectangular wave and sine wave can be given as examples of a wave of a polarity changing voltage.

Furthermore, preferably, the amount of reduction of electric charge is set such that a voltage generated by the ceramic capacitor when the capacitor is heated to a high temperature is not greater than a predetermined value. In this case, the charge is sufficiently freed, preferably reducing time required for that purpose.

Also preferably, the amount of charge remaining in the ceramic capacitor is monitored and the DC voltage applied to the ceramic capacitor is adjusted based on the amount of electric charge. Accordingly, the electrostatic absorption charge is preferably neutralized with high precision.

Although the manner in which the DC voltage applied to the ceramic capacitor is not limited, there are given some ways in which a fixed DC voltage has been applied and then cut off when a predetermined amount of residual charge is obtained, in which a voltage is gradually reduced as the amount of residual charge approaches a predetermined value.

BRIEF DESCRIPTION OF THE DRAWINGS

Embodiments of the invention will now be described, by way of example only, and with reference to the accompanying drawings, in which.

DESCRIPTION OF THE PREFERRED EMBODIMENTS

Preferred embodiments of the present invention will now be described in detail with reference to the accompanying drawings.

A method of processing a ceramic capacitor according to an embodiment of the present invention will be described with reference to FIGS. 1 to 5 and FIG. 6. FIGS. 1 to 5 correspond respectively to a status of a ceramic capacitor before application of a DC voltage, a process of applying a DC voltage, a process of discharge, a process of neutralizing electrostatic absorption charge, and a process of short-circuiting. FIG. 6 is a flowchart of the processing method. Referring to FIGS. 1 to 5, a ceramic capacitor 10 comprises a pair of electrodes 11 and a dielectric member 12 therebetween. The dielectric member 12 includes electric dipoles 13, directions of which are indicated by arrows. Positive poles of the electric dipoles 13 are indicated by +signs whereas negative poles thereof are indicated by −signs. Positive charges are denoted by 14, and negative charges are denoted by 15.

A first DC voltage source 16 is used to apply a DC voltage to the ceramic capacitor 10 to cause the electric dipoles 13 to align in a predetermined direction. A second DC voltage source 17 is connected to the ceramic capacitor 10 so as to have a polarity opposite to that of the first DC voltage source 16, and is used for applying a DC voltage having a polarity opposite to that of the DC voltage applied by the first DC voltage source 16. A short-circuit line 18 is used to electrically short-circuit the electrodes 11 of the ceramic capacitor 10.

Before application of DC voltage (FIG. 1 and step S1 in FIG. 6) to the ceramic capacitor 10, the electric dipoles 13 in the internal dielectric member 12 are allowed to rotate freely, and the electric dipoles 13 are electrically neutralized each other by positive and negative poles thereof. Thus, a required amount of capacitance is present. Schematically, the electric dipoles 13 have opposing positive and negative poles in rectangular particles that are allowed to rotate freely.

Figure 1:
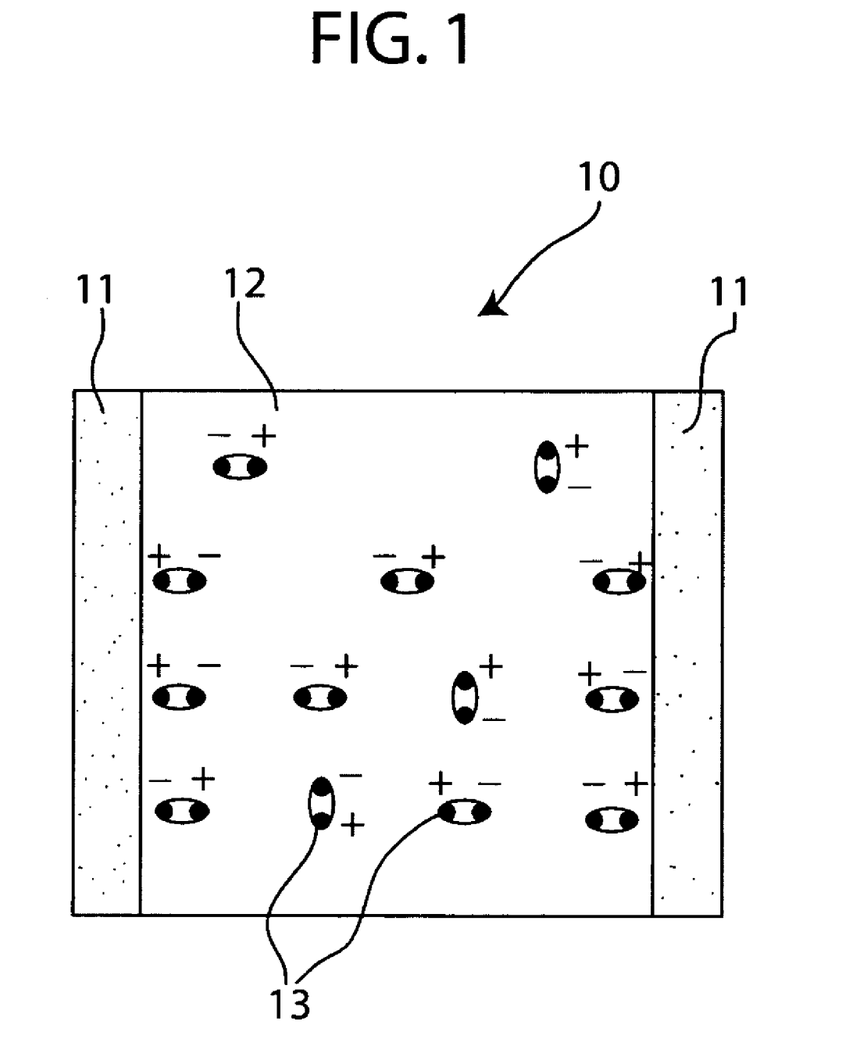
FIG. 1 is a schematic diagram of a ceramic capacitor before application of a DC voltage in a method of processing a ceramic capacitor embodying the present invention.
Figure 2:
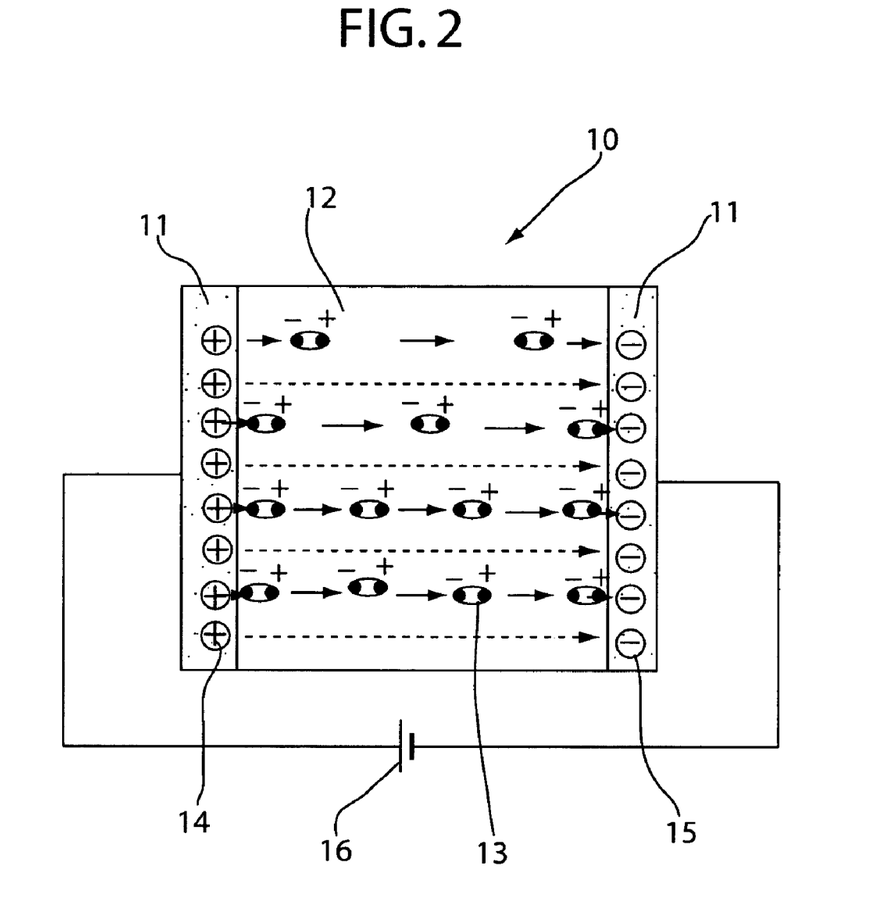
FIG. 2 is a schematic diagram of the ceramic capacitor during application of a DC voltage in the method according to the embodiment.

Application of DC Voltage (FIG. 2 and Step S2 in FIG. 6)

In order to perform characteristics screening tests including an insulation resistance test and a withstand voltage test on the ceramic capacitor 1, in step S2, the first DC voltage source 16 is connected to the ceramic capacitor 10. Accordingly, the electric dipoles 13 within the ceramic capacitor 10 are aligned so that the negative poles thereof face an electrode 11 with the positive charges 14 in the ceramic capacitor 10 whereas the positive poles thereof face an electrode 11 charged with the negative charges 15.

As a result, after the application of a DC voltage, the directions of the arrows of the electric dipoles 13 in the ceramic capacitor 10 are aligned to inhibit flow of current; that is, capacitance is lowered.

Insulation resistance and withstand voltage are measured in the tests when charging is complete.

Figure 3:
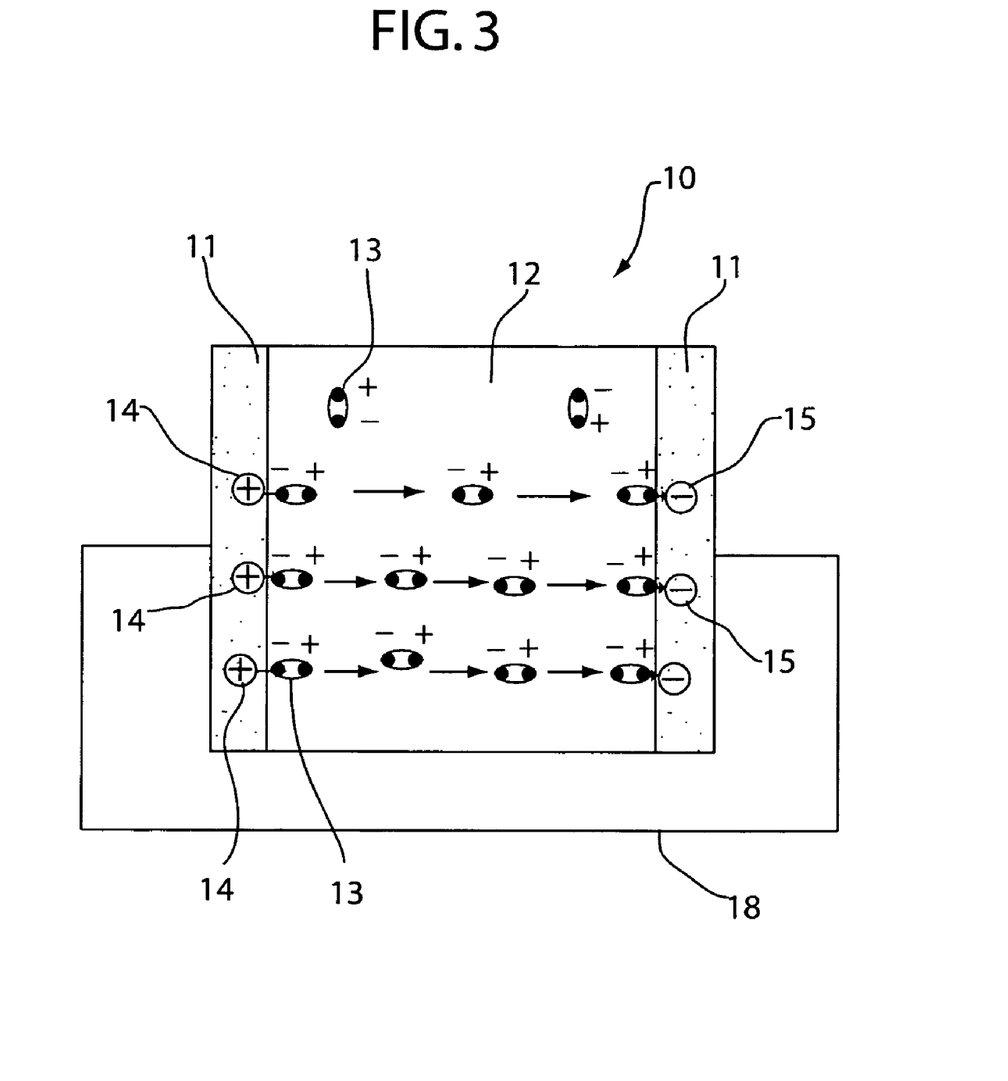
FIG. 3 is a schematic diagram of the ceramic capacitor during discharge in the method according to the embodiment.

Discharge (FIG. 3 and Step S3 in FIG. 6)

Then, the short-circuit line 18 is connected between the two electrodes 11 whereby the ceramic capacitor 10 is discharged. Accordingly, the positive charges 14 and the negative charges 15 at the electrodes 11 of the ceramic capacitor 10 decrease; however, some positive and negative charges 14 and 15 are trapped by the electric dipoles 13 and remain in the ceramic capacitor 10, which constitute electrostatic absorption charge.

That is, some of the electric dipoles 13 are allowed to freely rotate, but the remaining dipoles are aligned in the direction of the arrows, as shown in FIG. 3. In this state, capacitance of the ceramic capacitor 10 is lowered.

Figure 4:
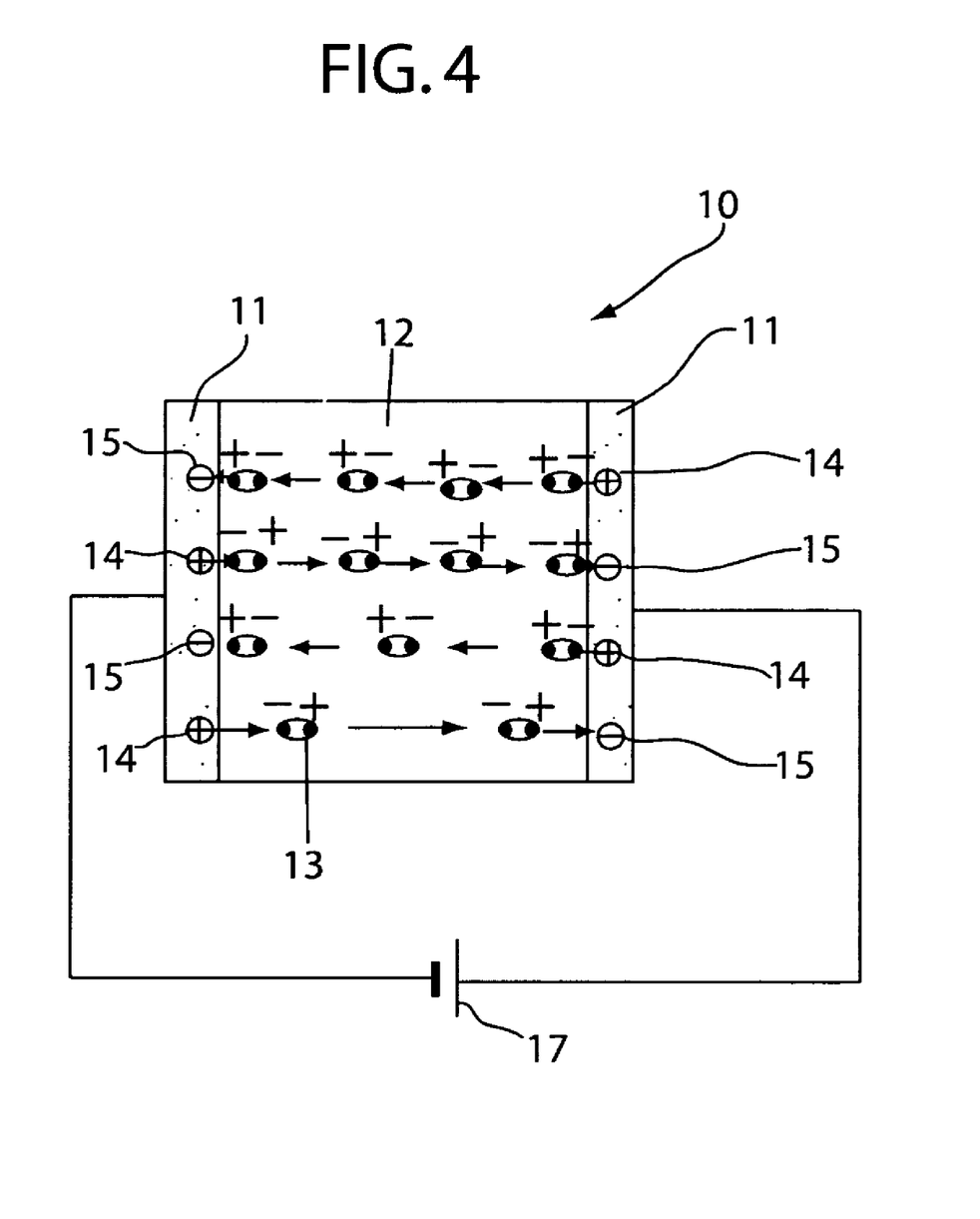
FIG. 4 is a schematic diagram of the ceramic capacitor during application of a DC voltage having an opposite polarity in the method according to the embodiment.

Application of DC Voltage having Opposite Polarity (FIG. 4 and Step S4 in FIG. 6)

Then, the second DC voltage source 17, having a polarity opposite to that of the first DC voltage source 16, is connected to the ceramic capacitor 10. The connection causes some of the electric dipoles 13 in the ceramic capacitor 10 to align in the opposite direction to the previous polarization, as indicated by arrows in FIG. 4. In FIG. 4, two types of arrows in mutually opposite directions are shown. Arrows to the left represent the direction of polarization associated with the first DC voltage source 16 (polarization in a first direction), whereas arrows to the right represent the direction of polarization associated with the second DC voltage source 17 (polarization in a second direction).

Electrostatic absorption charge is neutralized by the polarization in both directions, and is thereby reduced or eliminated.

Figure 5:
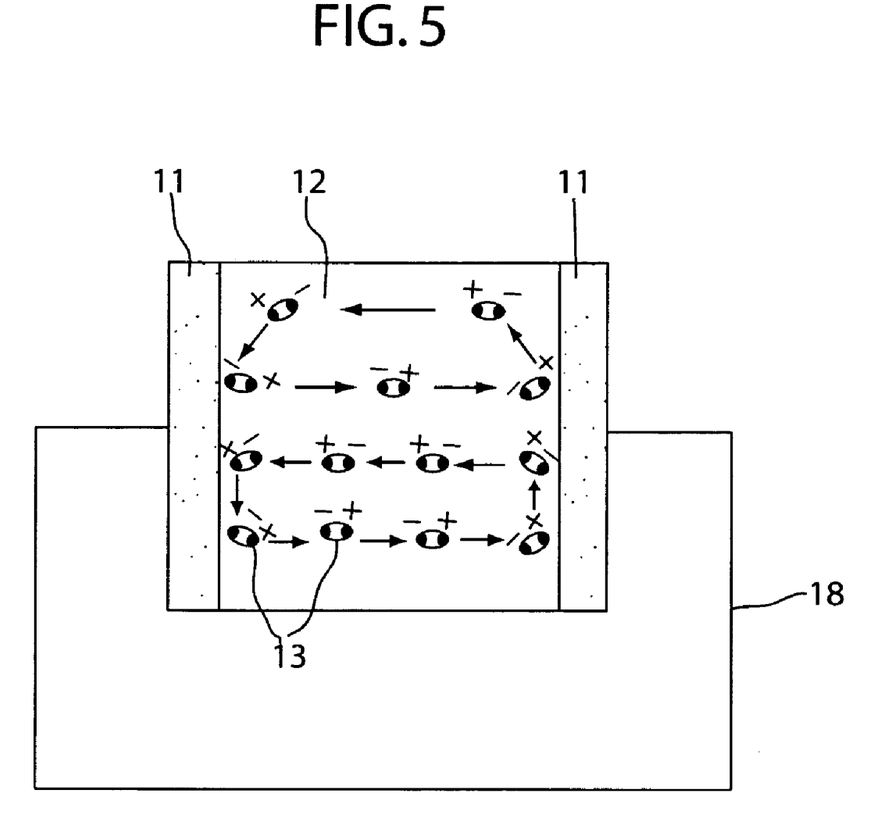
FIG. 5 is a schematic diagram of the ceramic capacitor during discharge in the method according to the embodiment.
Figure 6:
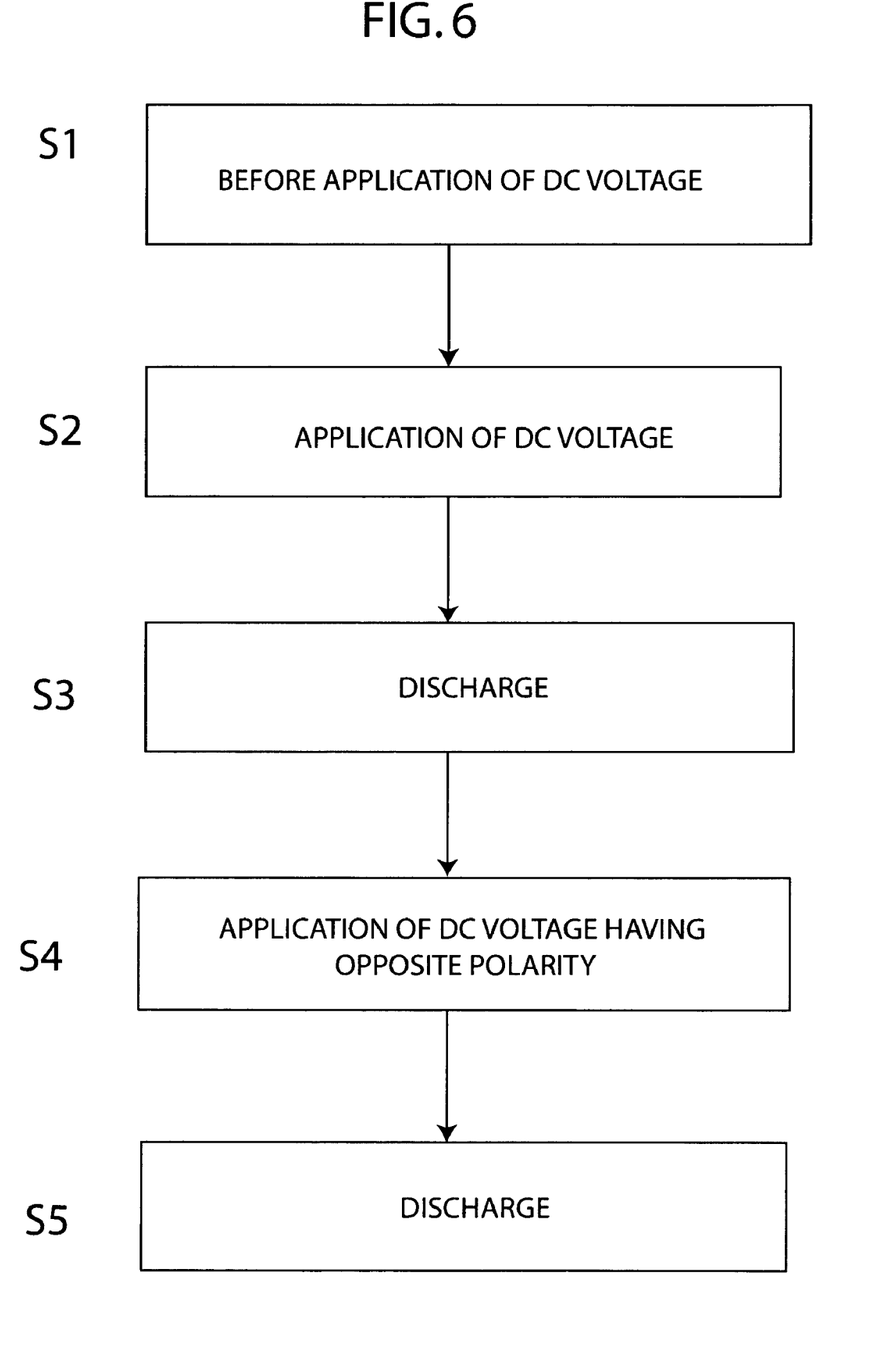
FIG. 6 is a flowchart showing the steps in the processing a ceramic capacitor according to the embodiment.

Discharge (FIG. 5 and Step S5 in FIG. 6)

Then, as shown in FIG. 5, the short-circuit line 18 is connected between the electrodes 11 of the ceramic capacitor 10, whereby the ceramic capacitor 10 is discharged. Accordingly, the electric dipoles in the first direction of polarization and the electric dipoles in the second direction of polarization in the ceramic capacitor 10 are connected with each other.

In this state, the amount of electrostatic absorption charge is extremely small. However, as opposed to the state shown in FIG. 1, where all the electric dipoles are allowed to freely rotate, in the state shown in FIG. 5, the electric dipoles are aligned, so that the capacitance of the ceramic capacitor 10 is reduced.

According to this embodiment having the processing steps described above, residual charge is considerably reduced. Thus, a voltage generated in a subsequent process, for example, in a process of soldering a ceramic capacitor to a circuit board, is reduced. Furthermore, the need for the known annealing process is eliminated from the process of manufacturing the ceramic capacitor 10, serving to reduce amount of work. Accordingly, manufacturing cost and manufacturing time are reduced.

Furthermore, the capacitance of the ceramic capacitor 10 can be recovered by a high-temperature process, such as soldering after manufacturing.

The present invention is not limited to the embodiment described above, and various applications and modifications are possible.

(1) In the embodiment described above, the second DC voltage is applied in opposition to the first DC voltage. Alternatively, a voltage having a changing polarity, such as a rectangular wave voltage or a sine wave voltage, may be applied in opposition to the first DC voltage.

That is, instead of the application of the second DC voltage in step S4 in the embodiment described above, a voltage having a changing polarity, such as a rectangular wave voltage or a sine wave voltage, is applied, the amplitude thereof being gradually decreased, and application of the voltage is finally stopped.

According to this embodiment, the voltage applied to the ceramic capacitor is large at an earlier stage of application of the changing-polarity voltage, so that most electric dipoles in the ceramic capacitor alternate their directions; that is, the electric dipoles rotate. As time elapses and the amplitude of the polarity-changing voltage decreases. Some electric dipoles no longer follow changes in the changing-polarity voltage, so that electric dipoles aligned both in the first and second directions are present in the ceramic capacitor. At a final stage, the level of the changing-polarity voltage reaches substantially zero and application of the changing-polarity voltage is then stopped. At this time the amount of electric dipoles in the first and second direction are substantially equal. When the amounts of electric dipoles in the respective directions become substantially equal as described above, electrostatic absorption charge is substantially cancelled out and is eliminated. Thus, this modification achieves the same advantage as the previous embodiment.

(2) In the embodiment described earlier, a charging process is performed on the ceramic capacitor in the step S2 the step S4 and a discharging process is performed on the ceramic capacitor in step S3. Alternatively, an integration process may be performed simultaneously with the charging and discharging in the step S3, and an integration process also performed in step S5 simultaneously with charging. The charging is controlled based on the integrated value so that the amount of electrostatic absorption charge will not be greater than a predetermined amount. In that case, the electrostatic absorption charge can be controlled so as to cancel out while actually measuring the amount of electrostatic absorption charge, serving to reduce electrostatic absorption charge more certainly. Accordingly, the amount of charge remaining in the ceramic capacitor can be monitored with high precision.

Figure 7:
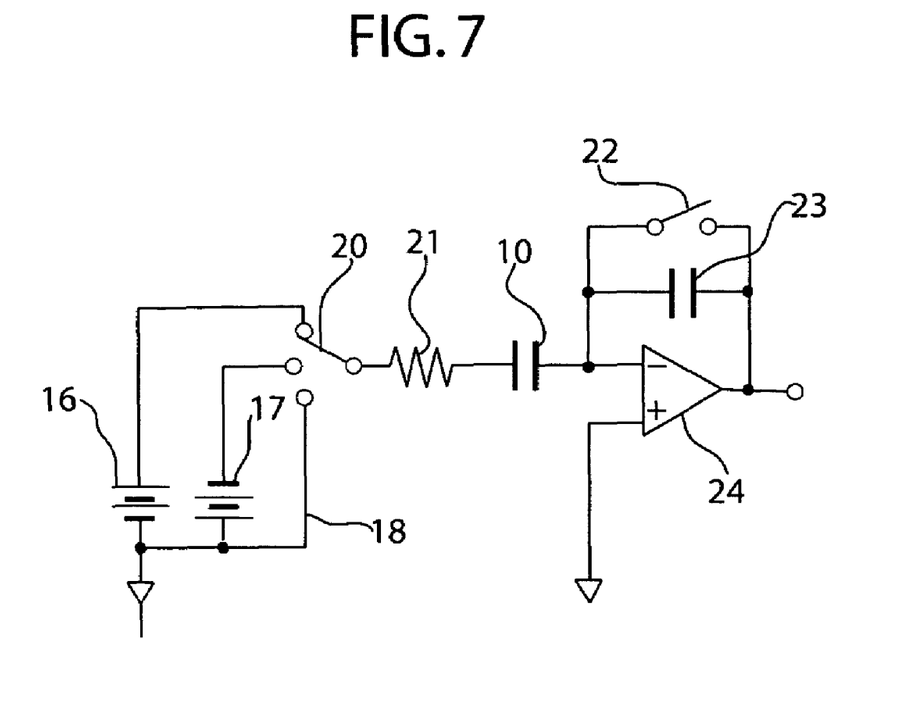
FIG. 7 is a circuit diagram monitoring the residual electric charge in the ceramic capacitor.

A monitoring circuit will now be described in detail with reference to FIG. 7. In FIG. 7, reference numeral 10 indicates a ceramic capacitor which is an object to be monitored, 16 indicates a first DC voltage source applying a positive voltage to the ceramic capacitor 10, 17 indicates a second DC voltage source applying a negative voltage to the ceramic capacitor 10, 18 indicates a short-circuit line, 20 indicates a multiplexer, 21 indicates a current limiting resister, 22 indicates an electric relay, 23 indicates a current integral capacitor, 24 indicates an operational amplifier.

The circuit which is situated in the left side of the ceramic capacitor 10 in FIG. 7 is the circuit to apply the positive voltage to the ceramic capacitor 10 by the first DC voltage source 16 and the negative voltage to the ceramic capacitor 10 by the first DC voltage source 17 respectively. The multiplexer 20 through the current limiting resister is connected to the first DC voltage source 16, the second DC voltage source 17 and the short-circuit line 18, therefore the ceramic capacitor 10 can be connected to them selectively and it becomes possible to switch application of the voltage to the ceramic capacitor 10 into discharge. In the case of the application of the voltage to the ceramic capacitor 10, the multiplexer 20 enables to switch a pole of the application of the voltage.

The circuit which is situated in the right side of the ceramic capacitor 10 in FIG. 7 is as current integral circuit comprising the electric relay 22, the current integral capacitor 23 and the operational amplifier 24. The electrostatic absorption change stored in the ceramic capacitor 10 is output from the current integral circuit as an output voltage "V".

Moreover, the current integral circuit will here by described. As current "i" from the ceramic capacitor 10 passes the current integral capacitor 23 by the character of the operational amplifier 24, the circuit output voltage "V" is expressed with "−VC" when the capacitance of the current integral circuit 23 is put with a "C". Since the circuit output voltage "V" means time integration of the current "i" flowing through the ceramic capacitor 10, the stored electric charge "Q" is expressed with "Q=dt=−VC". Therefore, when the positive voltage is applied to ceramic capacitor 10, the stored electric charge "Q" increases because the current "i" is positive, whereas when the negative voltage is applied to the ceramic capacitor 10, the stored electric charge "Q" decreases because the current "i" is negative. Accordingly, in the circuit described in FIG. 7, the voltage which is proportional to the amount of the electric charge stored in the ceramic capacitor 10 is output.

In this embodiment, the electric relay 22 is used to as to reset the amount of stored electric charge of the current integral capacitor 23 into "0" by discharging the electric charge stored in the current integral capacitor 23. It becomes possible to monitor the electric charge only of the ceramic capacitor 10 being processed currently by means of closing the electric relay 22 just before processing the ceramic capacitor 10 and starting processing it by opening the electric relay 22 then.

Other modifications are possible without departing from the scope of the invention which is defined solely by the following claims.

The invention claimed is:

1. A method of processing a ceramic capacitor, in which electric charge remaining in an internal electrode thereof is reduced after applying a first DC voltage to the ceramic capacitor, the method comprising the steps of:

performing screening tests on the ceramic capacitor by applying the first DC voltage;

discharging charges stored in the ceramic capacitor after said screening tests; and after the discharging step, neutralizing electrostatic absorption charge in the ceramic capacitor by applying a voltage that generates a polarity opposite to a polarity generated in the ceramic capacitor when the first DC voltage is applied, wherein an amount of the electrostatic absorption charge in the ceramic capacitor is monitored while the voltage that generates a polarity opposite to the first DC voltage is applied and the voltage is adjusted based on the amount of the electrostatic absorption charge measured, such that the ceramic capacitor is neutralizing after the voltage is applied.

2. A method of processing a ceramic capacitor according to claim 1, wherein the voltage applied to the ceramic capacitor is a second DC neutralizing voltage having a polarity opposite to the first DC neutralizing voltage having been applied.

3. A method of processing a ceramic capacitor according to claim 1, wherein the voltage applied to the ceramic capacitor is a polarity changing voltage, whose amplitude is reduced gradually.

4. A method of processing a ceramic capacitor according to claim 3, wherein amount of electrostatic absorption charge reduction is set such that a voltage generated by an electric discharge of the ceramic capacitor when the ceramic capacitor which heated to a high temperature is not greater than a predetermined value.

5. A method of processing a ceramic capacitor according to claim 1, wherein amount of electrostatic absorption charge reduction is set such that a voltage generated by an electric discharge of the ceramic capacitor when the ceramic capacitor which heated to a high temperature is not greater than a predetermined value.

* * * * *